United States Patent [19]
Isaacs et al.

[11] 3,874,799
[45] Apr. 1, 1975

[54] METHOD AND APPARATUS FOR COLOR SPECTROPHOTOMETRY

[75] Inventors: David Isaacs, Tustin; David L. Fried, Yorba Linda; George A. Ameer, Santa Ana, all of Calif.

[73] Assignee: Color Control, Inc., Santa Ana, Calif.

[22] Filed: June 1, 1973

[21] Appl. No.: 366,090

[52] U.S. Cl. ............... 356/173, 250/226, 250/228, 356/97, 356/178, 356/179, 356/195, 356/236
[51] Int. Cl. .......................... G01j 3/46, G01j 3/34
[58] Field of Search ........ 250/228, 226; 356/43, 97, 356/173, 178, 179, 195, 210, 218, 236

[56] References Cited
UNITED STATES PATENTS

| | | | |
|---|---|---|---|
| 2,263,938 | 11/1941 | West | 250/228 X |
| 2,342,771 | 2/1944 | Voigt | 356/97 X |
| 2,686,452 | 8/1954 | Bentley | 250/228 X |
| 3,519,352 | 7/1970 | Engborg | 356/43 |

OTHER PUBLICATIONS

Wendlandt et al., Reflectance Spectroscopy, Interscience Publishers, New York, 1966, Chapter IV, pages 91–128.

*Primary Examiner*—Ronald L. Wibert
*Assistant Examiner*—F. L. Evans
*Attorney, Agent, or Firm*—Gausewitz, Carr & Rothenberg

[57] ABSTRACT

Reflectance measurements of a color sample are made by employing a diffusing sphere having target ports for a color sample, a white standard and a black body. A mirror is mounted within the sphere for pivotal motion about the axis of an exit port to sequentially reflect light from the several targets along a common optical path into a polychormeter which disperses the received light into its spectrum and projects the spectra upon a sensor surface. The sensor may be in the form of an array of light-sensitive elements or the face of an image tube that is scanned or sampled at selected wave lengths of points of the spectrum to be employed in the reflectance measurement. For each sample point, the intensity of light reflected from the black body is substracted from the intensity of light reflected from the sample and is also subtracted from the intensity of light reflected from the white standard to thereby correct both the sample and white standard measurement for both electrical and other noise of the system, and for stray light within the optical path that impinges upon the sensor surface. The ratios of intensities of the sample to the standard provide reflectance values that may be employed in various color measurements, including calculations of tristimulus values and chromaticity coordinates.

45 Claims, 7 Drawing Figures

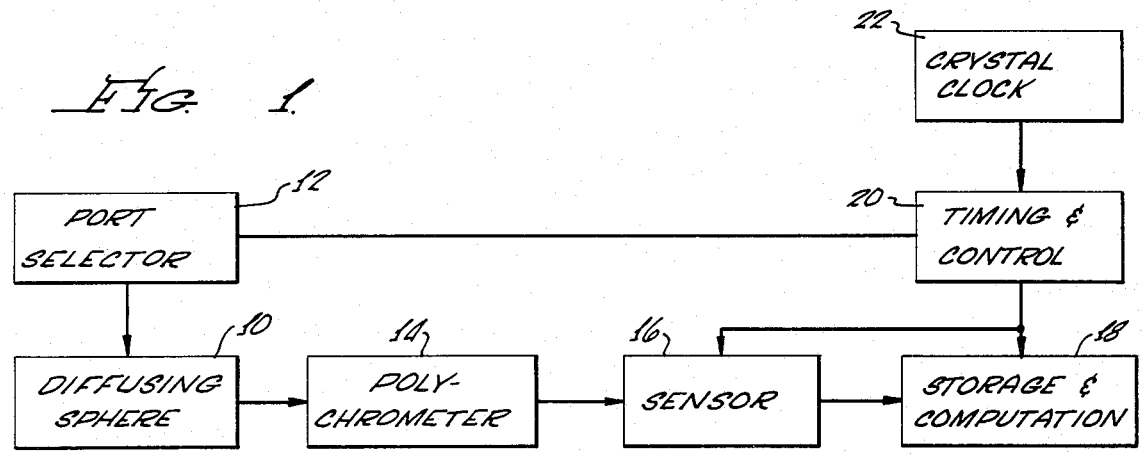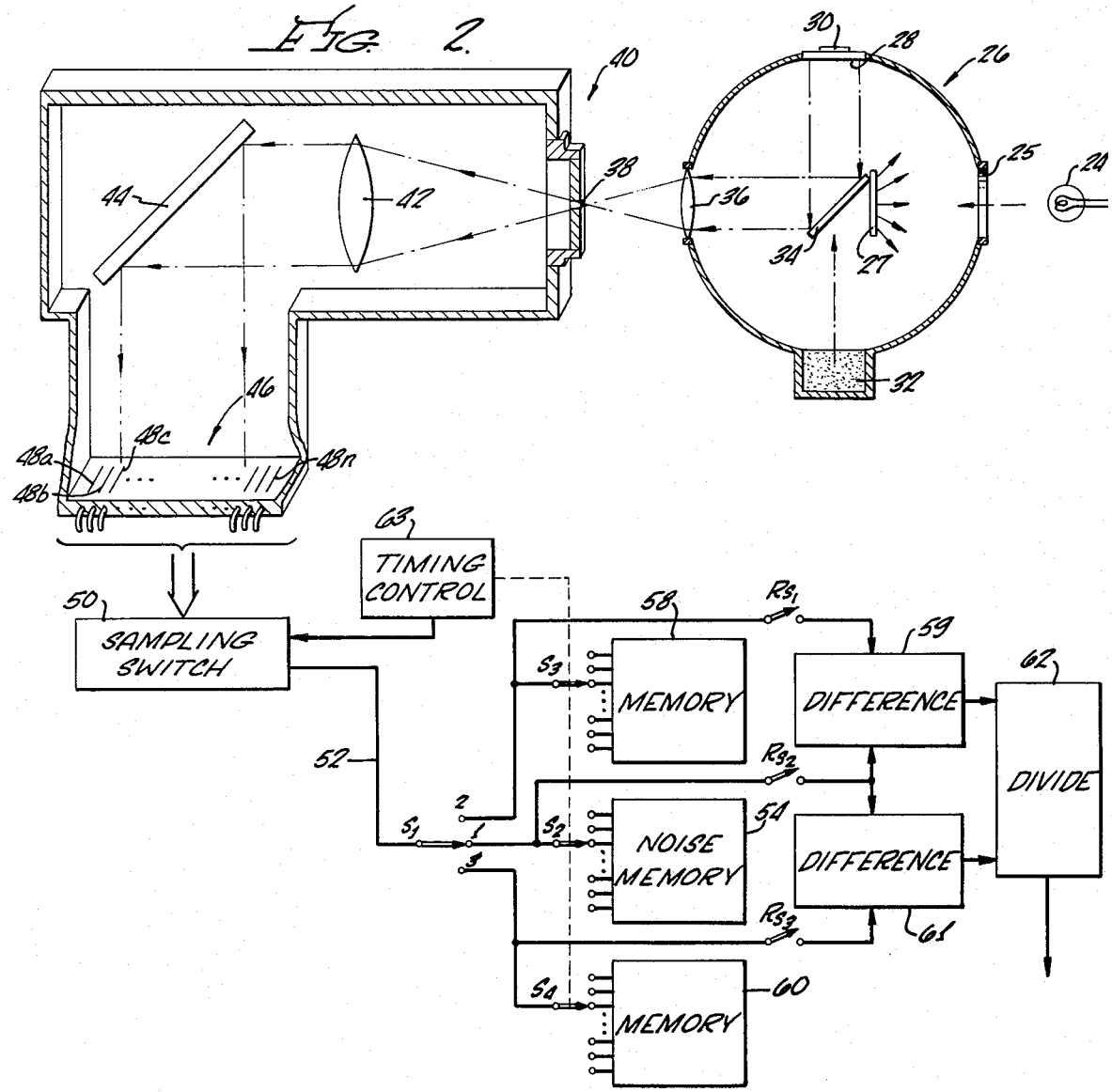

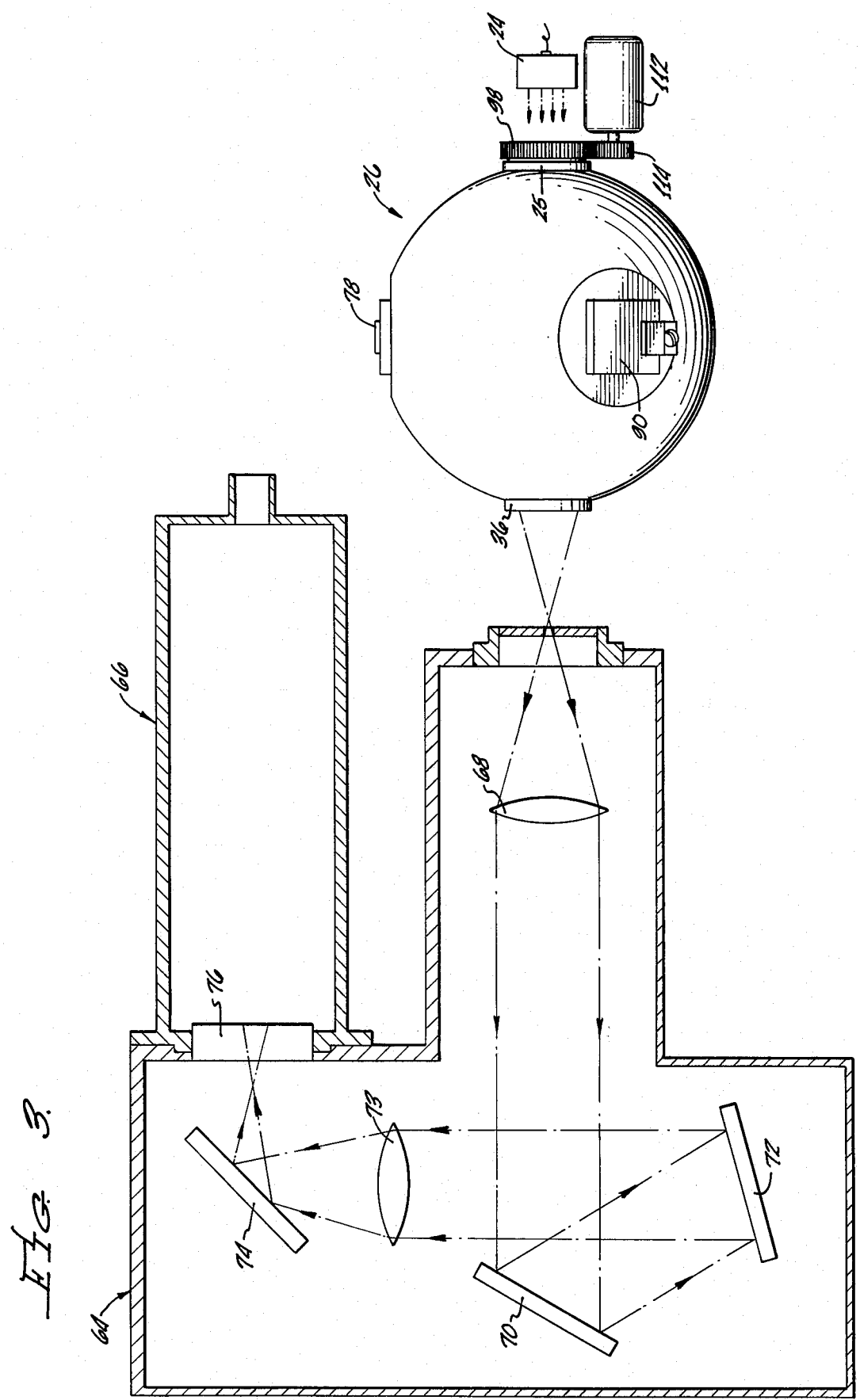

METHOD AND APPARATUS FOR COLOR SPECTROPHOTOMETRY

BACKGROUND OF THE INVENTION

1. Field of the Invention

The present invention relates to methods and apparatus for measurement of intensity of radiant energy and more particularly concerns measurement of energy intensities for analysis and determinatiton of color.

2. Description of Prior Art:

Objective measurement of color requires some type of light measuring device in a measurement that is quite complex, involving physics, physilogy and even psychology. The human eye operates upon an interplay or balance of three stimuli to sense color. Tristimulus values or weighting functions correspond to the three stimuli sensed by the human eye and of which stimuli the balance represents subjectively determined color. If the spectral distribution of light is analyzed, plotting intensity versus wave length, the resulting curve may be weighted according to the tristimulus functions to afford a complete description and predication of the measured color. Prediction of color resulting from the mixture of light from objects of two different colors or equal intensity is determined by use of chromaticity coordinates which may be computed from the tristimulus values. The chromaticity coordinates comprise a complete representation of the three parameters of color. Thus, tristimululs values may be calculated from measured values of spectal distribution. Chromaticity coorinates may be plotted from the calculated tristimulus values. Nevertheless, although chromaticity coordinates are of significant utility in analysis and comparison or colors, it is not possible to work back from chromaticity values to specify intensity values or color components required for matching color samples. Thus, the matching of color samples, that is, the analysis of a given sample for the purposes of producing additional samples of matching color, cannot be achieved from chromaticity coordinates, but must be based upon reflectance measurements.

For comparison of colors of two samples, a standard and trial sample for example, a transformation of the chromaticity coorindates based upon a formulation of MacAdam may be employed. According to the transformation and formulation of MacAdam, a color difference in MacAdam units may be computed. It is found that, because of peculiarities of the human color sensinig system, man is capable of much finer color difference resolution in the relatively low reflectance areas of the dark blues and reds than in the high reflectance areas of the bright yellows and greens, for example. Thus, as a practical matter, the darker the color, the easier it is for man to distinguish between related colors. Accordingly, not only is quantitative and objective color measurement and matching by instruments necessary and desirable, but such measurement must have maximum or at least equal precision at low light intensities reflected from the darker colors.

For standardization of color measurement, reflectance values are generally employed as percentages of reflection from a white standard. Such standards use white pigments of optimum reflectivity, such as titanium or barium sulfate. The reflectance ratios are measured and established as the ratio of intensity of reflectance from the color sample to the intensity of reflectance from the white standard, the ratio being measured and provided at each of a number of selected sample points of the optical spectrum.

A common commercial instrument employs a stabilized light bulb and optics directing a beam of light to a sample with a number of filters interposed one after the other. Filtered and reflected light is picked up by a photosensitive device of which the output is employed to indicate intensity of the light impinging thereon. More complex spectral photometers are employed to sweep the reflectance measurement through the color spectrum by illuminating the sample and the white standard with light of successively different wave lengths from a movable prism or grating. In some of these instruments, the resulting signals are weighted according to the tristimulus values which are then directly available in digital form. In both of these types of systems, that using the grating and that using the filter wheel, energy of light reflected from the targets is then measured by a light-sensitive device, such as a photomuliplier tube. These systems use both a white standard and the color sample and employ separate optical paths for light reflected from the standard and sample. Light in these paths is "chopped" and transmitted along parallel paths to the light-sensitive device wherein the measurements are made. Both optical and elecronic null systems have been used to determine the ratio of energy from the sample and from the white standard to indicate reflectance percentages.

The U.S. Pat. to Razek et al, No. 1,964,365, shows a measurement measurment system employing illumination by narrow parts of the spectrum and either manually moving a sample and a white standard or using two ports and two photosensors in a diffusing sphere. The U.S. patents to B. D. Herderson, No. 2,992,588, and F. Grum et al, No. 3,512,895, are illustrative of spectrophotometers for reflectance measurement employing a monochrometer of which the output is chopped to alternately illuminate a sample and a standard with the desired color or white light.

Systems presently in use suffer from a number of defects. The point in the optical spectrum that is employed for measurements at any given time depends upon either the physical positioning of the filter wheel or the mechanical positioning of a grating. Therefore, the exact spectral wave length is subject to error, since mechanical parts tend to wear and electronic positioning circuits tend to drift. The various positions of a filter wheel or movable grating may not be precisely repeatable. Particularly for those samples having curves with relatively steep or near vertical portions (in the graph of intensity vs. wave length), a slight variation in the wave length of the narrow band of illumination may give rise to major error.

Use of separate optical paths for light from the sample and from the white standard in prior systems also gives rise to error since the two paths are difficult to precisley match. Additional optical elements are provied in order to first separate the light into two paths and then again direct the light to the common photosensitive device. The different paths may be subject to differing amounts of stray light and to differing aging or drift characteristics.

Still another disadvantage of prior systems is of greatly increased significance in the light of the previously described ability of the human eye to achieve finer resolution for dark colors than for bright colors. Reflectance measurements for dark colors are based upon relatively low light intensities reflected from the sample. The white standard, which is the reference for the reflectance value measurement, represents the condition of 100 percent reflectance, a maximum intensity of reflected light. Noise in the system, on the other hand, is generally kept to a relatively low value, but nevertheless may comprise a significant portion of light intensities reflected from different samples. Thus, noise in the system will introduce greater errors in the measurement of those colors with respect to which the human eye has the increased resolution.

Although prior systems compensate for electrical noise in the system, there is no suggestion in any of the prior art of compensating color measurements for noise due to stray light. Stray light may enter the system despite difficult, complex and costly attempts to block its entrance. Such stray light may exist in the optical paths from several sources, including light derived from the primary source of illumination which finds its way to the photosensitive device, bypassing both the color and white standard target. It is possible to measure electronic noise by taking a reading on the electrical output of the system with the light input totally blocked, but such a measurement would not account for noise generated by the photosensitive surface in the presence of received radiant energy, nor would it account fot stray light in the system.

Still another disadvantage of prior systems is the time required for a single measurement encompassing the entire optical spectrum. It is not uncommon for such systems to require as much as two full minutes for a single measurement employing 20–30 sample points of the color spectrum being measured.

In an article entitled "The Growing Range of Mulitchannel Detection", in the January, 1971, issue of *Optical Spectra*, G. G. Olson described systems of multichannel spectrophotometry employing improved detectors in the form of television camera tubes, such as silicon vidicon and other tubes containing internal image intensification with conventional photocathode front ends. An optical mulitchannel analyzer that has been built by SSR Instruments of Santa Monica, California, is described in an article entitled "Optical Multichannel Analyzer" by F. W. Karasek in the January, 1972, issue of *Research/Development*, pages 47–50, and in an article entitled "Applications of an Optical Multichannel Analyzer" by G. G. Olson in the February, 1972, issue of *American Laboratory*. As described in these articles, the SSR instrument employs electronic spectral scanning performed within the vidicon tube and further employs the face of the vidicon tube to image both background and signal channels so as to allow background and random noise to be substracted subtracted the signal. The background and random noise includes camera tube dark current, shot noise and resistor thermal noise. However, this method of noise compensation employs different areas on the face of the photo-sensitive surface and does not account for difference in noise generated or received by the different surface areas, particularly where different optical paths are involved. Further, the arrangement of the SSR instrument does not compensate for stray light that occurs in the optical path of the signal, for stray light emanating from the primary source of radiation that illuminates the target, nor for stray light in the reflectance measurement system.

According, it is an object of the present invention to provide methods and apparatus for measurement of color that avoid or substantially minimize the above-mentioned problems.

SUMMARY OF THE INVENTION

In carrying out principles of the present invention in accordance with an exemplary embodiment thereof, improvement in noise elimination is accomplished by subtracting from the several intensity measurements an intensity measurement representing energy transmitted from a black body. According to one aspect of the invention, reflectance measurements for color are made by comparing the reflections from a color sample over its spectrum with reflections from each of a white standard and a black body over corresponding spectra. Problems of matching plural radiant energy collecting paths are minimized by use of a path that is common to all of the measurements over substantially the entire length of the transmission. In a specific arrangement, a mirror is moved to sequentially view each of three targets whose reflectance is employed in the measurement. Energy is reflected from the mirror along a single optical path to a radiant energy-sensitive device at which intensities are changed to electrical quantities.

BRIEF DESCRIPTION OF THE DRAWINGS

FIG. 1 is a block diagram of a color measuring system embodying principles of the present invention;

FIG. 2 is a schematic representation of significant mechanical, optical and electrical components of a color measuring system embodying principles of the present invention;

FIG. 3 is a view of optical components, the diffusisng sphere and polychrometer of a preferred form of the invention;

DETAILED DESCRIPTION

Figure 4:
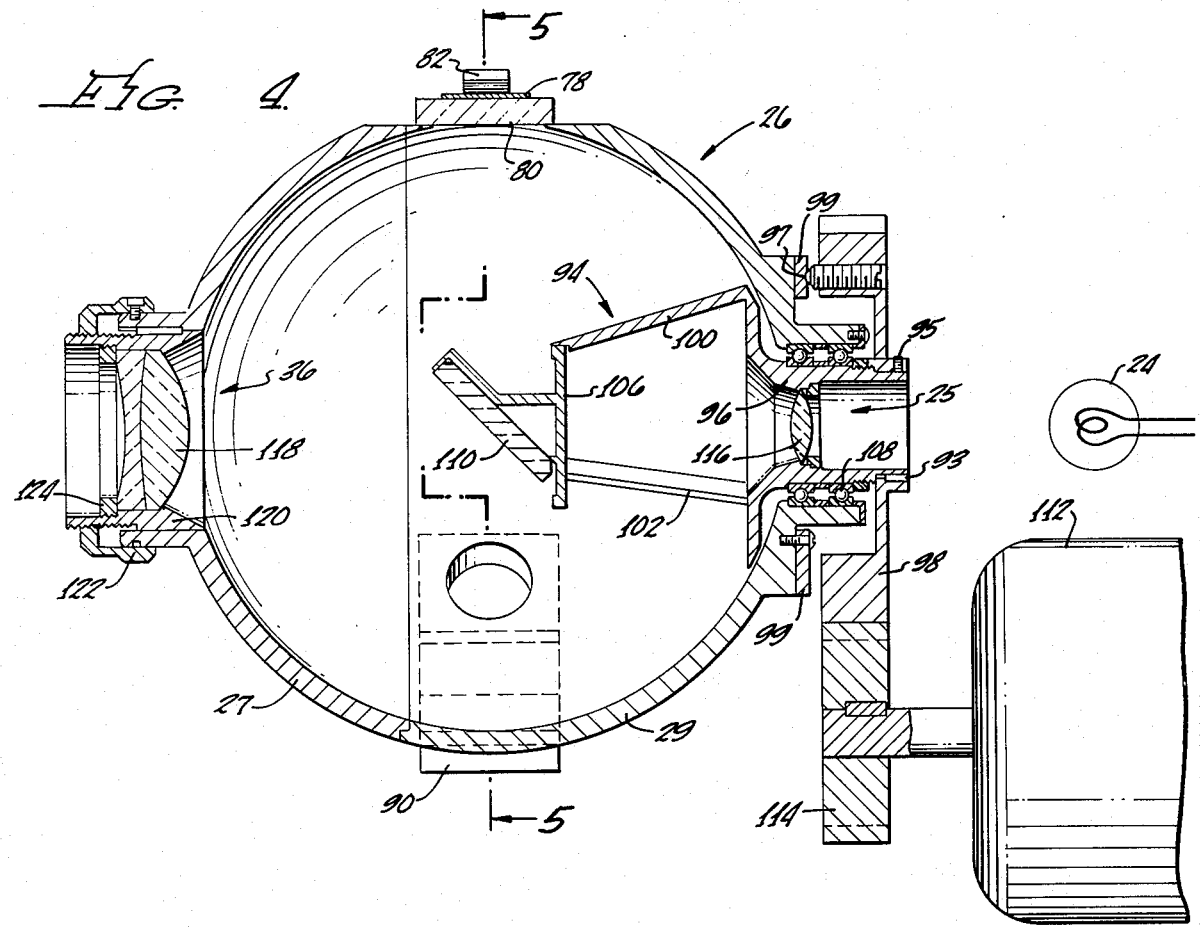
FIGS. 4 and 5 are cross-sectional views showing details of the diffusing sphere of FIG. 3.

The general arrangement of a color measuring system employing principles of the present invention is illustrated in block form in FIG. 1, wherein a diffusing sphere 10 having a plurality of target ports and a source of illumination is operated under control of a port selector 12 to sequentially view the several targets positioned at the target ports. The mirror transmits light reflected from the targets in sequence to a polychrometer 14 which spectrally disperses the transmitted light and causes the spectra to impinge upon the surface of a sensor 16 which may take the form of an array of light-sensitive elements or the face of an electronic image tube. The image upon the sensor surface is scanned and sampled. The resulting electrical signals represent measured intensities of impinging light and are fed to storage and computation apparatus indicated generally at 18. The storage and computation, the scanning or readout of the sensor surfaace, surface, the selection of a target to be viewed by means of the port selector, are all under synchronized control of a timing and control circuit 20 which is basically timed from a crystal clock 22. The storage and computation equipment 18 performs the required arithmetic operation of subtracting signals representing stray light and electrical noise from other target signals, such as the signals from the sample and the white standard. The corrected signals are also ratioed to provide the desired reflectance percentages when this measurement is desired. All of the required arithmetic steps are carried out at each of the wave lengths of the spectra or carried out at each of a selected number of the wave lengths of the several spectra so as to provide the desired information at all of the spectral points selected for sampling.

As will be pointed out in greater detail hereinafter, the described arrangement employs a measurement made when the optical system is viewing a black body so as to generate a signal representing both electrical and stray light noise. The arrangement also employs a novel scanning of the several targets illuminated by a single diffusing sphere so as to provide a common optical path that is shared for the measurement of reflectance from all of the targets. Thus, problems attendant upon matching of separate paths are substantially eliminated and optical components required for chopping, dividing and combining paths are eliminated. Since the entire spectrum is imaged simultaneously upon the sensor and scanning is achieved electronically, mechanical scanning mechanisms are eliminated and measurement speed is greatly enchanced.

Illustrated in FIG. 2 is a simplified schematic representation of mechanical, optical and electrical components of a color measuring system embodying principles of the present invention. Additional details of mechanical and optical structures and an alternate arrangement of electronic sensing and data handling will be described in greater detail below. Radiant energy from a source 24 is directed through the input port 25 of a hollow diffusing spherical cavity 26 to impinge upon a diffusing plate 27 mounted within the sphere. Energy is reflected from the diffusing plate to and throughout the interior surface of the sphere and illuminates a plurality of targets that are mounted at target ports formed in the spherical cavity. A first target port 28 is adapted to mount a first target, which may be a sample 30 of which the intensity of reflected energy is to be measured. A second target port mounts a black body target 32, which may be a cavity or other device that is made as nearly nonreflective as possible. Thus, the black body cavity may be entirely lined with a non-reflective surface and made with an angulated energy path to improve the trapping of radiant energy. A third target port (not shown in FIG. 2) is formed in the spherical cavity and mounts a white standard target for use in making reflectance measurements.

A mirror 34 is mounted substantially symmetrically at the center of the cavity for pivotal motion about an axis that is aligned with an exit port 36 of the cavity. Suitably mechanism (not shown in FIG. 2), to be described in greater detail hereinafter, is provided to position the mirror about its axis so that it will alternatley reflect energy transmitted from any of the target ports.

For an arrangement employing two, three or more targets, the mechanism is arranged to sequentially pivot the mirror to reflect energy from each of the targets, in a selected sequence, through the exit port 36 of the diffusing spherical cavity 26. Energy reflected from the mirror and exiting from the exit port is transmitted along an energy collecting path that includes an entrance slit 38 of a polychrometer 40 having a lens 42 and a spectrally dispersing grating 44. Thus, energy entering the polychormeter is dispersed by the grating and its spectrum is imaged upon the surface of the photosensitive device 46.

Various types of photosensitive devices may be employed in the practice of this invention, including vidicons, image orthicons, iconoscopes and other image forming tubes or arrays of light-sensitive elements. Illustrated in the arrangement of FIG. 2 is an exemplary array of photosensitive devices comprising a plurality of light-sensitive diodes or strips of serially-connected diodes 48a –48n. The diode array extends in a first direction (substantially vertical as viewed in FIG. 2) for the height of the spectrum reflected from the grating and extends in a second direction (horizontal in FIG. 2) for the entire length of the spectrum. The elements of the diode array have a center-to-center spacing in the horizontal direction, from one end of the imaged spectrum to the other, that corresponds to spacing between points of the spectrum (as it illuminates the array) that are optically spaced (in nanometers for example) by the distance between selected sample points. Accordingly, if it is desired to sample the spectrum that illuminates display surface 46 at points that are 20 nanometers of the spectrum apart, the center-to-center spacing of adjacent diodes 48a, 48b, etc., will be the equivalent of 20 nanometers on the image of the spectrum that is formed on the surface of the array.

The imaged optical spectrum, as employed in color measurements, extends from 400 to 700 nanometers and may be imaged to cover a length of two inches, for example, on the sensor surface. Accordingly, in this example, adjacent diodes employed for sampling at 20 nanometer intervals of the spectrum are positioned at about 0.13 inch center-to-center spacing. Other sampling intervals are readily available by employing other diode spacing or by sampling only selected diodes and skipping others.

In the simplified arrangement illustrated in FIG. 2 for purposes of exposition, the diode array is scanned and read out serially by means of a time division multiplexor or sampling switch 50 that provides an output via lead 52 to a three-position switch $S_1$. When in position number 1, the switch feeds the signals from the several diodes sequentially appearing at the output of the multiplexor to a noise storage memory 54 via a memory addressing switch $S_2$. When in the number 2 and 3 position, $S_1$ feeds the signals to target and white standard memories 58, 60 via memory addressing switches $S_3$ and $S_4$. The operation may be analog or digital. Each memory includes a group of signal storage elements or locations, each individual to a single intensity sample of one of the three targets. Each storage element of each memory may be read out individually and in sequence via the addressing switches $S_2$, $S_3$ and $S_4$ and read switches $RS_1$, $RS_2$ and $RS_3$, when closed, to the respective difference circuits 59, 61. The outputs of the difference circuits are fed to a ratio circuit or divider 62 to provide an output representing the ratio of the signal stored in target memory 58 with respect to the signal stored in the white standard memory 60, both corrected for noise, and at each sampled wave length. The various switches and mirror drive may be operated manually to perform the sequenced operations to be described below. Nevertheless, for faster operation, the entire operation may be timed and sequenced automatically under control of a timing control circuit 63.

For precision reflectance measurements, as indicated above, it is desired to provide an output signal that is precisely proportional to the ratio of reflectance of a sample whose color is to be measured to the reflectance of a white standard, Preferably, the sample reflected signal and the white standard reflected signal are corrected not only for noise generated within the sensing array and other electrical circuitry, but also for stray light. Such stray light may enter the system because of imperfect light shielding or may be reflected along the optical path from the light source and diffusing sphere, bypassing the selected target that is being viewed at any given instant. Thus, although the diffuser plate will prevent almost all light from the source from being transmitted directly to the exit port of the diffusing sphere, some of the light within the sphere may be reflected from or refracted around edges of the diffusing plate and, further, may be reflected from edges of the target ports. The entrance slit of the polychrometer and the exit lens of the diffusing sphere are adjusted so as to optimally transmit to the polychrometer only light reflected from a central portion of the target being viewed at a given instant. Nevertheless, some stray light will exist in the optical path and accordingly provide an undesired noise in the several output signals.

According to one feature of the invention, this stray light is stored together with electrical noise of the system and then subtracted from subsequent measurements. A noise signal indicative of stray light is generated by causing the optical path to receive light that is derived from viewing the black body, which itself will reflect little or no light. Accordingly, light received during the time that the optical path is directed to view the black body will include a stray light in the system. The sensor output signal, when viewing the black body, includes all noise in the system, including that due to the stray light and that due to the electronics.

In operation of the simplified system of FIG. 2 for making reflectance measurements of a sample, the diffusing sphere employs all three target ports, one for the sample whose color is to be measured, a second for the black body and a third for the white standard. Each of these target ports is viewed by positioning the reflecting mirror at a different position of rotation about its axis under control of a port selection mechanism to be described below. Initially, read switches $RS_1$, $RS_2$ and $RS_3$ are open, and switch $S_1$ is in position number 1 to feed signals from the sampling switchh to noise memory 54 via memory addressing switch $S_2$. With light from source 24 being fed through the entrance port 25 of the diffusing sphere, the reflecting mirror 34 is positioned to view the black body 32 and reflect light through the exit port 36 and into the polychrometer 40. In this position, light in the optical path is relatively low intensity, largely comprising the stray light, since substantially no light is reflected from the black body. The timing control 63 initiates operation of the time division multiplexor or sampling switch and, concomitantly, causes the memory addressing switches to step from one memory location to the next in synchronism with the stepping of the sampling switch from one diode of the array 46 to the next. Accordingly, the black body or noise signal at each sampled point in the imaged spectrum is stored in a unique position of memory 54, each corresponding to a different sample point. It will be understood, of course, that each memory has a number of locations at least equal in number to the number of sampls of the spectrum, so that each sample is stored in a unique memory location.

Accordingly, the several samples of the noise signal have been stored and the mirror may be rotated to a second position. The memory input is suitably blocked (by means not shown) as the mirror rotates from one target port to the next. The second position of the mirror in this exemplary operation will cause light from the white standard to be reflected through the diffusing sphere exit port 36, spectrally dispersed by the polychrometer 40 into a specrum that is imaged upon the diode array 46, and sequentially sampled by the sampling switch 50. Switch $S_1$ is moved to its number 3 position so that the sensor output is fed only to the memory 60 via its memory address switch $S_4$, which again is caused to step through the several memory locations in synchronism with the stepping of the sampling switch from one sampled diode to the next.

Now the mirror is again rotated, this time to receive light transmitted from the third target, which is the sample of which the color is to be measured. Again, the input of both memories is blocked during motion of the mirror to avoid storage of any signals other than those received from the desired target. Switch $S_1$ is moved to its number 2 position whereby signals from the sampled points of the imaged spectrum of the color sample are sequentially fed to the memory address switch $S_3$. The latter is caused to step in sequence with the stepping of the sampling switch whereby siganls representing sampled points of the spectrum of the color sample are stored in the memory 58.

In a preferred arrangement, each scan of a spectrum will be repeated a suitable number of times in order to enchance or integrate the signal measurement. Thus, with the mirror positioned to view the black body target, for example, the sampling switch and memory address switches will repeatedly step from one end of their range to the other some 10 to 20 times (although fewer or greater number of scans may be employed), whereby the signal stored in each memory location represents an integral multiple of the signal obtained by means of a single sampling of a given spectral position.

Now, with the memories storing the selected spectral samples of both the color sample and the white standard, the electrical signals are corrected both for electrical noise and stray light noise during readout of the memories. For such readout, the read switches $RS_1$, $RS_2$ and $RS_3$ are closed, inputs to the memories are disabled and the memory address switches $S_2$, $S_3$ and $S_4$ are caused to step through the memory locations. With each memory location readout, the signals from memories 58 and 54 are differentially combined in circuit 59 and the signals from memories 60 and 54 are differentially combined in circuit 61, whereby the black body noise signals are subtracted from both target and white standard signals. The signals from the two difference circuits are ratioed in divider 62 to provide an output signal representing the reflection percentage of the color sample as compared to the white stardard, at the particular spectral point, and as corrected for both stray light noise and electricl noise.

Although time division multiplexing of the light-sensitive array is illustrated for serial storage and data processing, it will be readily appreciated that the elements of the light-sensitive array may be read out in parallel. The several steps of storage, combination and division may likewise be performed in parallel for all sample points of a given spectrum (although the spectra of the three targets will still be viwed and handled sequentially) to therefore provied a more rapid readout.

Illustrated in FIG. 3 are the diffusing sphere 26, polychrometer 64 and vidicon sensor 66 arranged for practice of a preferred form of the present invention. The diffusing sphere has an input port 25 arranged to receive radiant energy from a polychromatic lamp source 24. As an example, a tungsten lamp may be used for illumination of the integrating sphere and a filter (not shown) is interposed between the lamp and the sphere to provide illumination conforming to CIE (Commission International de L'Eclarage) specifications for source A, C and D6500. Light from the diffusing sphere is projected through its exit port 36 to the polychrometer where it falls upon an entrance slit. Light passed by the slit is focused by a collimating lens 68 and mirror 70 upon a dispersing grating 72. The spectrum of dispersed light is reflected from the grating and focused by means of a lens 73 and reflecting mirror 74 upon the face 76 of the vidicon sensor tube 66.

The entrance slit of the polychrometer and the grating are arranged to present the spectrum of the light beam that is received at the entrance slit over the optical spectral interval of 400 to 700 nanometers so as to cover a region of 0.500 inches in length and 0.187 inches in height, substantially centered on the face of the sensor tube. Although many types of imaging tubes may be used for the sensor, the exemplary vidicon sensor employs an RCA 4532 magnetic focus and deflection vidicon tube having a silicon diode array target structure. The physical nature of the diode array in this vidicon tube is such that there are 300 scan intervals over a distance of 0.500 inches on the face of the tube. Accordingly, there is one scan interval for each nanometer in the imaged spectrum. Further details of the nature and application of the scanning of the vidicon tube will be described below in connection with FIG. 7.

Figure 5:
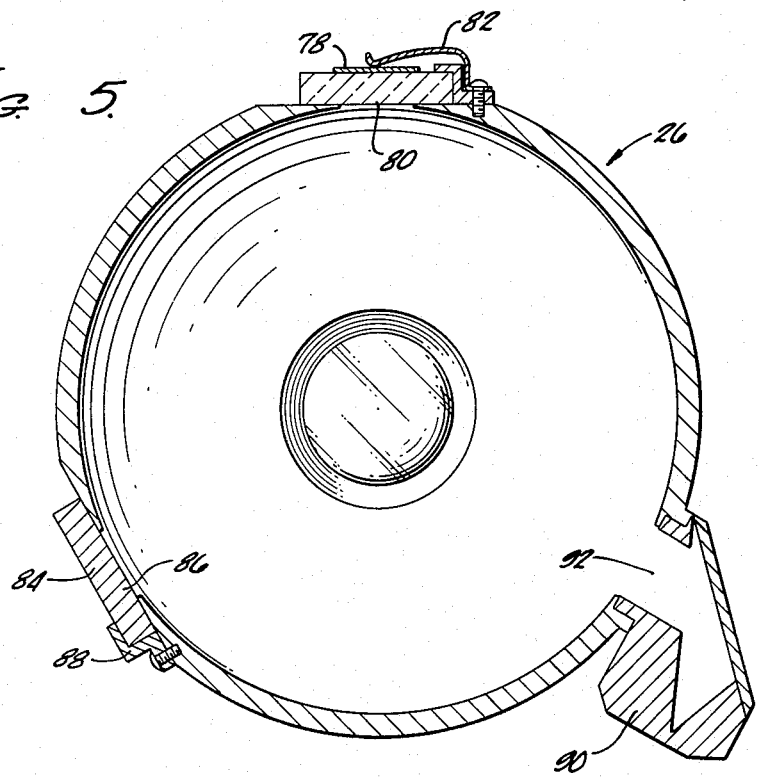
Figure 6:
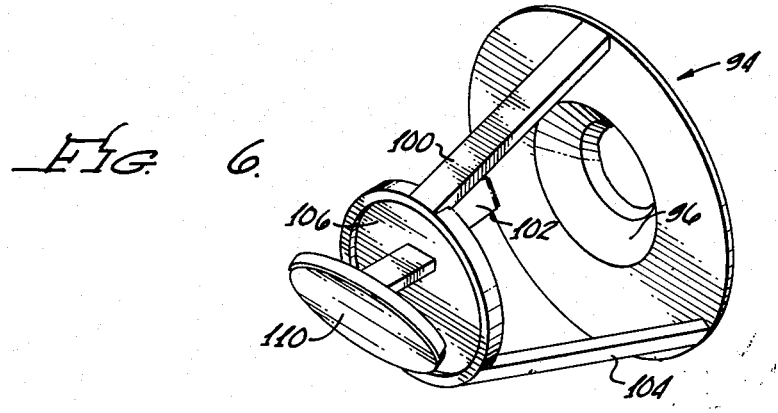
FIG. 6 shows the diffusing system mirror and part of its support.

As shown in FIGS. 4, 5 and 6, the diffusing sphere 26 is made in two parts, 27 and 29, suitably secured to each other by screws (not shown) so as to provide a rigid integral interior spherical cavity. The sphere is provided with three target ports. A sample 78 of which a color is to be measured is detachably secured to the first target port 80 as by a clamping spring 82. A white standard 84, which is not changed as frequently as the color sample, is detachably secured to a second target port 86 by means of one or more screws and clamping structures 88. A black body cavity 90 is fixed to a third target port 92 and comprises an angulated energy receiving and trapping path of which the walls are coated with light-absorbent and nonreflective material.

Journaled in and coaxial with the entrance or input port 25 of the diffusing sphere 26 is a mirror support 94 (FIGS. 4, 6) comprising a hub 96 having a portion extending externally of the sphere. Fixed to the externally extending hub portion by means of a key 93 and screw 95 is a mirror drive gear 98 carrying a spring-pressed ball detent 97 that cooperates with an annular plate 99 fixed to the sphere and having three circumferentially spaced recesses for respectively receiving the detent ball to precisely position the mirror support 94 for viewing the respectivve ports.

Also fixed to the hub 96 and extending inwardly of the sphere are a plurality of standards 100, 102 and 104 that carry a diffusing plate 106 formed of aluminum or other suitable materail, coated with a highly reflective coating. This coating may be the same as that employed on the inner surface of the diffusing sphere. Preferably, the diffusing plate and the entire inner surface of the diffusing sphere, except for the areas of the ports, are coated with a highly reflective paint, such as a white barium sulfate reflective paint.

The diffusing plate at the input port may be augmented by additional baffles (not shown) within the sphere to ensure that light from the tungsten source cannot reach the exit port without being reflected from one of three targets or from the interior surface of the sphere. Although the size may be readily varied, it is contemplated that a preferred diffusing sphere will have an 8-inch internal diameter and each of the target ports will have a diameter of about 1 inche.

The three target ports are equally spaced around a great circle of the sphere 26 the lies in a plane normal to the axis of the input port 25 and normal to the axis of rotation of the mirror mounting assembly. The mirror mounting assembly is jounaled in the input port 25 by means of bearings 108 interposed between the inner neck of the port and the outer surface of the hub 96 of the mirror mounting assembly.

Fixed to the mirror support 94 is the port selecting mirror 110 having a reflective surface positioned at an angle of 45° with respect to the plane containing the great circle of the several ports and at an angle of 45° with respect to the axis of rotation of the mirror mounting assembly. Accordingly, the mirror may be moved to any one of three different positions in which it will be latched by detent means 97, 99 to receive light directed radially from the port being viewed at the given instant. The mirror will reflect such light along the axis of rotation of the mirror mounting assembly. This axis of rotation is coaxial with the input port 25 and is also coaxial with the exit port 36 of the sphere. A motor 112 and gear 114 are provied to drive the gear 98 and thus move the mirror among the three different pivotal positions thereof for selectively viewing one or the other of the three target ports. A lnes 116 is mounted within the input port and within the hollow hub of the mirror mounting assembly for directing light from the source 24 to and upon the diffusing plate. The latter is positioned and dimensioned so as to completely block the direct transmission of light from the input port 25 to the exit port 36 of the sphere. Accordingly, light entering the sphere is entirely reflected from the plate to and from the highly reflective surface of the sphere to provide a substantially uniform illumination of all of the target ports.

In a preferred arrangement, the exit port is provided with an adjustable focusing lens systems 118 having a focal point outside the polychrometer entrance slit. This arrangement enables the polychrometer to receive light reflected from a relatively small central portion of the target being viewed at any instant. The use of only a portion of the target helps to eliminate effects of stray light that may be reflected through the exit port from the mirror and which derives not from the target but from points in the sphere adjacent the target. The exit port lens system comprises the lens elements 118 fixed to a sleeve 120 slidable in the exit port and having an external threaded surface in engagement with an internally threaded adjusting nut 122 that is keyed to a circumferential groove in the exit port. An apertured ring 124 is threaded in the adjustable sleeve to secure the lens elements in position.

It will be seen that a common light path is provided from the viewing mirror through the diffusing sphere exit port, through the polycrometer and to the sensor. This common optical path in time shared by means of the sequential viewing provided by the pivotally positioned mirror.

Figure 7:
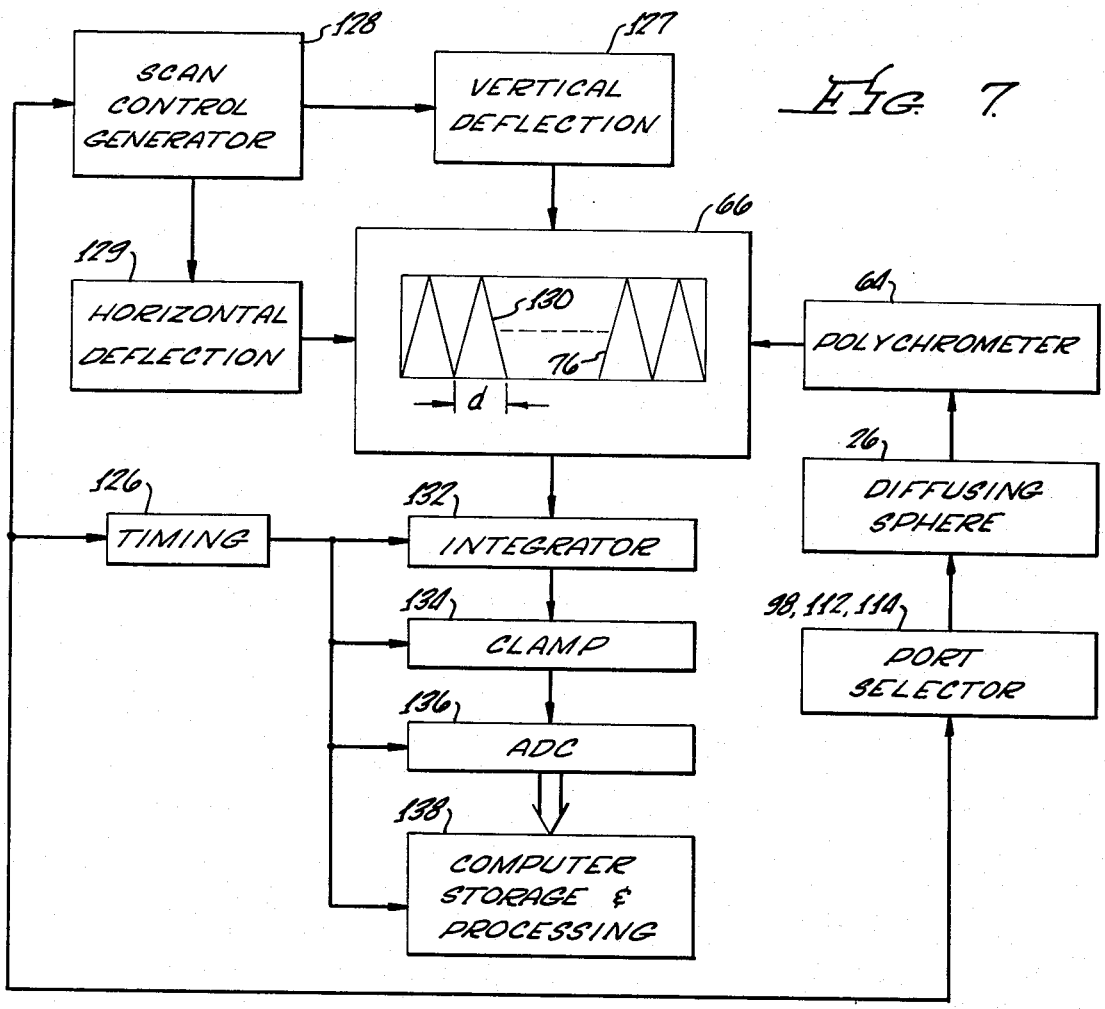
FIG. 7 illustrates an embodiment of the invention employing a vidicon sensor.

As illustrated in FIG. 7, overall timing control of the system shown in FIGS. 3, 4, 5 and 6 is provied by a timing control circuit 126 that generates signals to drive the port selector (illustrated in FIG. 4 as motor 112 and gearing 98, 114), to position the pivotal mirror for viewing of a selected port in diffusing sphere 26. Light transmitted from the selected target is reflected by the mirror to the polychrometer 64 where it impinges upon the face 76 of the vidicon sensor tube 66. The vidicon sensor tube is provided with a scanning beam that is driven from a scan control generator 128 and vertical and horizontal deflection circuits 127, 129 timed from the timing control 126. The scan control generator causes the scanning beam to deflect at a relatively slow rate horizontally across the face of the tube and to deflect vertically at a more rapid rate to provide a scan such as indicated at 130 in FIG. 7. Each complete vertical scan covers but a single sensor element (distance "d") of the face of the sensor tube. Accordingly, where there are 300 such elements in a distance of 0.500 inches on the face of the tube and where the spectrum from 400 to 700 nanometers covers 0.500 inches, each scan covers a single nanometer.

The vidicon scanning beam provides an electrical signal having a magnitude directly related to the intensity of the impinging optical energy. This signal is fed to an integrator 132 which accumulates the electrical signal of the scanning beam over a single full vertical scan (the scan of a single nanometer). The output of the integrator over each scan is held in a clamp 134 and fed to an analog-digital converter 136 that stores in a computer and processing circuit 138 the digital value of each vertical scan. Suitable gating (not shown) may be employed so as to obtain measurements at selected sampling points rather than at each and every scan. Thus, the sytem may be arranged to provide, for example, 15, 30 or 60 sample points over the 300-nanometer spectrum. When employing 15 sample points, each 20 scan would be read into the integrator, with scans between such 20 scans not being used. Similarly, for a finer resolution of measurement, 60 sample points may be employed wherein each 5th vertical scan of the vidicon would be integrated, digitized and stored for use in the computation. It will be readily undestood that, during the viewing of any single target, the vidicon beam will deflect through a number of complete horizontal scans for signal enchancement. During each such horizontal scan, selected vertical scans at each of the sample points are integrated, digitized and stored. From the storage, the arithmetic processing described above may be readily accomplished. Such processing will include the subtraction of the black body noise (stray light and electrical noise) signals at each sampled spectral point from both the target and white standard signals, and the division of the sample signals by the white standard signals to obtain the reflectance ratios, each such arithmetic operation being accomplished for each sample point.

Obviously, additional computation processing and display may be employed as deemed necessary or desirable. Suitable computation can be carried out by general purpose or by special purpose computers to automatically compute the desired tristimulus values and/or chromaticity coordinates and provided suitable displays of these and other parameters as required.

Although the described arrangement uses reflected energy from reflective targets, it will be appreciated that these methods and apparatus can be readily modified to provide equivilent measurements using light transmitted through targets having appreciable light transmitting capability.

There have bbeen described methods and apparatus for accurate measurement of radiation intensity and in particular, for accomplishing reflectance measurements for color analysis in a manner the affords extremely rapid measurement capabilities, employing a common optical path, no critical moving parts and elimination of noise, including stray light noise.

The foregoing detailed description is to be clearly understood as given by way of illustration and example only, the spirit and scope of this invention being limited only by the appended claims.

What is claimed is:

1. The method of making color measurements comprising the steps of
   impinging light from a light source upon a standard and a sample,
   collecting light from said light source that is transmitted along at least one optical collection path from said standard and from said sample,
   generatiing first and second signals indicative of collected light transmitted from said standard and sample respectively,
   generating a noise signal indicative of stray light included in said collected light,
   said stray light including light in said optical collection path derived from said source, and
   differentially combining said noise signal with each of said first and second signals so as to yeild third and fourth signals indicative of light transmitted from said standard and sample respectively as corrected for the presence of stray light.

2. The method of claim 1 including the step of dispersing light from said source into a spectrum, said steps of generating signals comprising the steps of generating said signals at each of a number of points of said spectrum, and wherein said step of combining comprises combining said noise and said first and second signals at each of said points of said spectrum.

3. The method of claim 2 wherein said step of dispersing light comprises dispersing light transmitted from said standard and from said sample.

4. The method of claim 3 wherein said step of collecting comprises the step of illuminating a light-sensitive area with said dispersed light transmitted from at least one of said standard and sample, and wherein said step of generating said first and second signals at said points of said spectrum comprises the step of generating electrical signals indiciative of intensity of illumination of points on said area corresponding to said points of said spectrum.

5. The method of claim 4 said light-sesnitive area comprises at least part of an image tube having a readout beam, and wherein said step of generating electrical signals comprises sweeping said readout beam across said area from one side of said spectrum to the other.

6. The method of claim 4 wherein said light-sensitive area comprises an array of photo-sensitive elements each providing an electrical output indicative of received illumination, and wherein said step of generating electrical signals comprises sensing the electrical outputs of said photo-sensitive elements.

7. The method of claim 4 wherein said step of illuminating said light-sensitive area comprises the steps of sequentially illuminating the same area with dispersed light transmitted from each of (a) said sample, (b) said standard, and (c) a black body reference target that is illuminated by light from said light source, but not necessarily in the stated sequence, said step of generating said noise signal comprising generating electrical signals indicative of intensity of illumination of points on said area when the area is illuminated by dispersed light transmitted from said black body reference target.

8. The method of making measurements for use in color analysis comprising the steps of
impinging light from a light source upon a target of which the color is used in said analysis,
collecting light from said light source that is transmitted along a first optical collection path from said target,
generating a target signal indicative of collected light transmitted from said target,
said target including a noise component indicative of stray light in said optical path that is not derived from said target,
generating a noise signal indicative of stray light included in said collected light,
said stray light including light in said optical collection path derived from said source but which is not derived from said target, and
differentially combining said noise signal with said target signal so as to yeild a corrected signal indicative of light transmitted from said target as corrected for the presence of stray light.

9. The method of claim 8 wherein said step of generating a noise signal comprises the steps of
impinging light from said light source upon a black body,
collecting light from said light source that is transmitted along a second optical collection path from said black body and concomitantly collecting light from said second optical path that is not derived from said black body.

10. The method of claim 9 wherein said first and second optical collection paths are substantially entirely the same path, and including means for alternately transmitting light along said path from said black body and from said target.

11. The method of claim 9 wherein said steps of generating target and noise signals comprise the steps of
alternately illuminating a light-sensitive area with light collected from said target and spectrally dispersed, and with light collected from said black body and spectrally dispersed,
generating and storing electrical target signals indicative of intensity of illumination of points of said area when illuminated by light from said target,
generating and storing electrical noise signals indicative of intensity of illumination of points of siad area when illuminated by light from said black body,
said step of combining comprising subtracting said electrical noise signals from said electrical target signals at each of said points of said area.

12. The method of claim 9 including the steps of
impinging light from said source upon a white standard,
collecting light from said light source that is transmitted from said white standard along a third optical collection path,
generating a standard signal indicative of light collected from said white standard and including a noise component indicative of stray light in said third optical path that is not derived from said white standard,
said step of combining comprising subtracting said noise signal from each of said standard signal and said target signal.

13. The method of claim 12 including the steps of generating a signal indicative of the ratio of (a) the combined noise and target signals to (b) the combined noise and standard signals.

14. The method of claim 13 wherein said first, second and third optical collection paths are substantially entirely the same path, and including means for alternately transmitting light along said path from said target, from said stadard, and from said black body, but not necessarily in the recited order.

15. Measuring apparatus comprising
a target,
a black body,
a source of radiation,
means for illuminating both said target and black body with radiation from said source, whereby radiation is transmitted from said illuminated target and black body along a path, and
means for differentially combining radiation in said path so as to compensate for stray radiation in said path.

16. Measuring apparatus comprising
a source of radiant energy,
a plurality of tagets including a first target and a black body positioned to be illuminated by energy from said source,
sensing means for generating a signal indicative of received radiant energy,
means for directing energy from said targets to said sensing means, and
means for differentially combining signals generated by said sensing means in response to receipt of energy directed from said black body and from said first target.

17. The measuring apparatus of claim 16 including a second target positioned to be illuminated by energy from said source, said means for directing energy including means for directing energy from said second target to said sensing means, said means for combining including means for differentially combining signals generated by said sensing means in response to receipt of energy directed from said black body and from said second target.

18. The apparatus of claim 17 wherein said means for directing energy comprises means for providing an energy collecting path common to transmission of energy from said targets to said sensing means, said path being nominally free of radiation that does not derive from said source.

19. The apparatus of claim 18 including means interposed in said path between said targets and said sensing means for dispersing energy.

20. The apparatus of claim 18 wherein said path includes a mirror, and means for effecting relative motion between said mirror and targets to sequentially reflect along said path energy received by the mirror from respective ones of said targets.

21. The apparatus of claim 20 wherein said path includes means interposed between said mirror and sensing means for illuminating said sensing means with a spectrum of energy reflected from said mirror along said path.

22. The apparatus of claim 21 wherein said sensing means comprises an energy-sensitive surface for receiving the spectra of energy reflected from said targets, and means for generating electrical signals indicative of intensity of energy received at different points on said surface.

23. The apparatus of claim 22 wherein said means for differentially combining signals comprises
means for storing a set of noise signals indicative of intensity of energy received from said black body at a number of points on said surface,
means for generating a set of first taget signals indicative of intensity of energy received from said first target at said points on said surface,
means for generating a set of second target signals indicative of intensity of energy received from said second target at said points on said surface, and
means for subtracting said noise signals from said first target signals and from said second target signals.

24. The apparatus of claim 23 including means for generating a set of reflectance signals indicative of the ratios of (a) the differences between said first target signals and said noise signals at said points, and (b) the differences between said second target signals and said noise signals at said points.

25. Measuring apparatus comprising
a diffusing cavity having an exit port and first and second target ports,
means for mounting a first target to said cavity at said first target port for illumination by energy reflected within said cavity,
means for mounting a second target to said cavity at said second target port for illumination by energy reflected within said cavity,
a radiant energy source for illuminating the interior of said cavity with radiant energy, and
a mirror mounted within said cavity for reflecting through said exit port energy from said target ports.

26. The apparatus of claim 25 wherein said second target comprises a black body, and including means for differentially combining energy reflected through said exit port from said first and second target ports.

27. The apparatus of claim 25 including means for moving said mirror between first and second positions in which it reflects energy from said first and second target ports respectively.

28. The apparatus of claim 27 wherein said mirror is mounted for pivotal motion about an axis aligned with said exit port and wherein said target ports are positioned to reflect light from one or the other thereof to said mirror and through said exit port when said mirror is pivoted to said first or second positions thereof.

29. The apparatus of claim 28 wherein said energy source provides optical energy, wherein a light reflecting sample is mounted at said first target port as said first target, and wherein a black body is mounted at said second target port as said second target.

30. The apparatus of claim 25 wherein said cavity is formed with a third target port, and including means for mounting a third target to said cavity at said third port for illumination by energy reflected within said cavity, said mirror being mounted to reflect energy from said third port through said exit port.

31. The apparatus of claim 30 wherein targets mounted at said first, second and third target ports comprise, respectively, a sample, a black body and a white standard.

32. The apparatus of claim 30 including an energy-sensitive device positioned to receive energy from said exit port, means for positioning said mirror to reflect energy through said exit port from said first, second and third target ports in a predetermined sequence, and means responsive to said device for subtracting energy received thereby from said second target port from energy received thereby from said first and third target ports.

33. The apparatus of claim 32 including an energy dispersing grating for transmitting to said energy-sensitive device spectra of energy projected from said exit port.

34. The apparatus of claim 33 wherein targets mounted at said first, second and third target ports comprise, respectively, a sample, a black body and a white standard.

35. The apparatus of claim 33 wherein said energy-sensitive device comprises an image tube having a photo-sensitive surface for receiving said spectra and having a scanning beam providing an output electrical signal, said tube including means for moving said scanning beam in a first direction across the length of each of said spectra and in a second direction in a plurality of scans across the width of each of said spectra, and means for storing the output electrical signal of said scanning beam at a number of said scans.

36. The apparatus of claim 35 including means for causing said scanning beam to repetitively move across the length of each of said spectra a number of times before the next spectrum is received by said photo-sensitive surface.

37. The apparatus of claim 25 wherein said cavity comprises an inner spherical surface of a hollow body and includes an input port positioned to receive energy from said source, said input port being axially aligned with said exit port, and means for blocking direct transmission of energy from said input port to said exit port.

38. The apparatus of claim 37 including a mirror support mounted to and extending at least partly within said body for pivotal motion about the axis of said port, said mirror being fixed to said support and having a reflective surface lying in a plane that extends at an angle relative to the axis of said exit port.

39. The apparatus of claim 38 wherein said means for blocking direct transmission comprises a diffuser reflecting body on said support between said mirror and said input port, whereby energy transmitted through said input port from said source is reflected from said reflecting body to said spherical surface before impinging upon said targets.

40. The apparatus of claim 39 including a polychrometer having an entrance slit positioned to receive energy reflected from said mirror through said exit port, and means at said exit port for variably focusing exiting energy upon said polychrometer.

41. The apparatus of claim 40 wherein said polychrometer includes an energy dispersing grating, a spectrum exit port, and means for directing energy from said grating through said spectrum exit port, and further including an energy-sensitive surface positioned to receive energy from said spectrum exit port, means for scanning said sensitive surface to generate electrical signals indicative of intensity of received energy at selected points of said surface, a plurality of storage devices, addressing means for storing said signals in different one of said storage devices, drive means for sequentially pivoting said support and mirror to first and second positions for respectively reflecting through said cavity exit port energy from said first target and from said second target, and means for synchronizing said addressing means with said drive means so that signals stored in one of said devices represent energy reflected from said first target and signals stores in another of said devices represent energy reflected from said second target.

42. In a radiant energy measuring system, the method of compensating for noise including stray energy entering the system and adversely affecting the measurement, said method comprising the steps of
 a. illuminating a target and a black body from an energy source,
 b. employing said system to measure enery received when the system is directed at said illuminated target,
 c. employing said system to measure energy received when the system is directed at said illuminated black body, and
 d. differentially combining measurements of energy received in steps (b) and (c).

43. The method of claim 42 wherein each of the measurements of steps (b) and (c) include the making of a plurality of measurements at different wavelengths within a band of wavelengths.

44. The method of making measurements for color comprising the steps of differentially comparing light received from a color sample, over its spectrum, with light received from each of a white standard and a black body over corresponding spectra.

45. The method of claim 43 wherein said source is a polychromatic lamp, and wherein said measuring system makes color measurements within said band.

* * * * *